(12) United States Patent
Lohman et al.

(10) Patent No.: US 7,716,215 B2
(45) Date of Patent: May 11, 2010

(54) SYSTEM, METHOD, AND COMPUTER PROGRAM PRODUCT FOR PROGRESSIVE QUERY PROCESSING

(75) Inventors: Guy Maring Lohman, San Jose, CA (US); Marki Volker, San Jose, CA (US); Mir Hamid Pirahesh, San Jose, CA (US); Vijayshankar Raman, San Jose, CA (US); David Everett Simmen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 11/940,185

(22) Filed: Nov. 14, 2007

(65) Prior Publication Data

US 2008/0177722 A1    Jul. 24, 2008

Related U.S. Application Data

(63) Continuation of application No. 10/698,828, filed on Oct. 31, 2003, now Pat. No. 7,383,246.

(51) Int. Cl.
*G06F 7/00* (2006.01)
(52) U.S. Cl. ....................................................... 707/721
(58) Field of Classification Search .................. None
See application file for complete search history.

(56) References Cited

U.S. PATENT DOCUMENTS

| | | | |
|---|---|---|---|
| 4,451,901 A | 5/1984 | Wolfe et al. | |
| 5,276,870 A | 1/1994 | Shan et al. | |
| 5,278,980 A | 1/1994 | Pedersen et al. | |
| 5,301,317 A | 4/1994 | Lohman et al. | |
| 5,412,804 A | 5/1995 | Krishna | |
| 5,412,806 A | 5/1995 | Du et al. | |
| 5,469,568 A | 11/1995 | Schiefer et al. | |

(Continued)

OTHER PUBLICATIONS

Kabara, Navin; David J. DeWitt; "Efficient Mid-Query Re-Optimization of Sub-Optimal Query Execution Plans", 1998, ACM, pp. 106-117.*

(Continued)

*Primary Examiner*—Charles Rones
*Assistant Examiner*—Dinku W Gebresenbet
(74) *Attorney, Agent, or Firm*—Jon A. Gibbons; Fleit Gibbons Gutman Bongini & Bianco P.L

(57) ABSTRACT

A method, system, and computer program product to make query processing more robust in the face of optimization errors. The invention validates the statistics and assumptions used for compiling a query as the query is executed and, when necessary, progressively re-optimizes the query in mid-execution based on the knowledge learned during its partial execution. The invention selectively places a number of CHECK operators in a query execution plan to validate the optimizer's cardinality estimates against actual cardinalities. Errors beyond a threshold trigger re-optimization, and the optimizer decides whether the old plan is still optimal and whether to re-use previously computed results. The invention addresses arbitrary SQL queries whose plans can contain sub-queries, updates, trigger checking, and view maintenance operations. The invention can handle concurrent update transactions or updates of common sub-expressions in a query execution plan without compromising consistency and isolation as locking information is tied to the record ID.

1 Claim, 16 Drawing Sheets

U.S. PATENT DOCUMENTS

| | | | |
|---|---|---|---|
| 5,542,073 | A | 7/1996 | Schiefer et al. |
| 5,546,576 | A | 8/1996 | Cochrane et al. |
| 5,574,900 | A | 11/1996 | Huang et al. |
| 5,598,559 | A | 1/1997 | Chaudhuri |
| 5,608,904 | A | 3/1997 | Chaudhuri et al. |
| 5,671,403 | A | 9/1997 | Shekita et al. |
| 5,680,603 | A | 10/1997 | Bhargava et al. |
| 5,687,362 | A | 11/1997 | Bhargava et al. |
| 5,694,591 | A | 12/1997 | Du et al. |
| 5,701,455 | A | 12/1997 | Bhargava et al. |
| 5,724,568 | A | 3/1998 | Bhargava et al. |
| 5,724,569 | A | 3/1998 | Andres |
| 5,734,888 | A | 3/1998 | Li et al. |
| 5,752,017 | A | 5/1998 | Bhargava et al. |
| 5,758,335 | A | 5/1998 | Gray |
| 5,832,477 | A | 11/1998 | Bhargava et al. |
| 5,848,404 | A | 12/1998 | Hafner et al. |
| 5,855,019 | A | 12/1998 | Bhargava et al. |
| 5,930,785 | A | 7/1999 | Lohman et al. |
| 5,940,819 | A | 8/1999 | Beavin et al. |
| 5,943,666 | A | 8/1999 | Kleewein et al. |
| 6,009,265 | A | 12/1999 | Huang et al. |
| 6,026,391 | A | 2/2000 | Osborn et al. |
| 6,081,801 | A | 6/2000 | Cochrane et al. |
| 6,088,691 | A | 7/2000 | Bhargava et al. |
| 6,092,062 | A | 7/2000 | Lohman et al. |
| 6,108,648 | A | 8/2000 | Lakshmi et al. |
| 6,205,441 | B1 | 3/2001 | Al-omari et al. |
| 6,212,514 | B1 | 4/2001 | Eberhard et al. |
| 6,243,710 | B1 | 6/2001 | DeMichiel et al. |
| 6,275,818 | B1 | 8/2001 | Subramanian et al. |
| 6,345,267 | B1 | 2/2002 | Lohman et al. |
| 6,351,742 | B1 | 2/2002 | Agarwal et al. |
| 6,353,818 | B1 | 3/2002 | Carino, Jr. |
| 6,353,825 | B1 | 3/2002 | Ponte |
| 6,366,904 | B1 | 4/2002 | BenHadda et al. |
| 6,408,292 | B1 | 6/2002 | Bakalash et al. |
| 6,438,741 | B1 | 8/2002 | Al-omari et al. |
| 6,470,330 | B1 | 10/2002 | Das et al. |
| 6,477,573 | B1 | 11/2002 | Lea |
| 6,480,843 | B2 | 11/2002 | Li |
| 6,502,094 | B1 | 12/2002 | Gvily et al. |
| 6,691,101 | B2 | 2/2004 | Mac Nicol et al. |
| 6,738,755 | B1 | 5/2004 | Freytag et al. |
| 6,763,359 | B2 | 7/2004 | Lohman et al. |
| 6,801,905 | B2 | 10/2004 | Andrei |
| 6,807,546 | B2 | 10/2004 | Young-Lai |
| 6,947,927 | B2 | 9/2005 | Chaudhuri et al. |
| 6,957,211 | B1 | 10/2005 | Tyulenev et al. |
| 6,980,981 | B2 | 12/2005 | Beavin et al. |
| 6,996,556 | B2 | 2/2006 | Boger et al. |
| 6,999,958 | B2 | 2/2006 | Carlson et al. |
| 7,007,009 | B2 | 2/2006 | Bestgen et al. |
| 2003/0115187 | A1 | 6/2003 | Bode et al. |
| 2003/0208440 | A1 | 11/2003 | Harada et al. |
| 2004/0010488 | A1* | 1/2004 | Chaudhuri et al. ............ 707/3 |

OTHER PUBLICATIONS

N. Bruno and S. Chaudhuri. Exploiting Statistics on Query.Expressions for Optimization, Proceedings of the 2002 ACM SIMOD International Conference on Management of Data, 2002, p. 263-274.

D. D. Chamberlin, M. M. Astrahan, W. F. King et al. Support for Repetitive Tracisactions and Ad Hoc Query in System R, ACM Transactions on Database Systems (TODS), vol. 6, n. 1, 1981, p. 70-94.

R. Cole and G. Graefe. Optimization of Dynamic Query Evaluation Plans, Proceedings of the 1994 ACM SIGMOD International Conference on Management of Data, 1994, p. 150-160.

A. Van Gelder. Multiple Join Size Estimation by Virtual Domains, Proceedings of the twelfth ACM SIGACT-SIGMOD-SIGART Symposium on Principles of Database Systems (PODS), 1993, p. 180-189.

P. Haas and A. Swami. Sampling-Based Selectivity Estimation for Joins Using Augmented Frequent Value Statistics, Proceedings of the Eleventh International Conference on Data Engineering, Mar. 1995, p. 522-531.

M. Stonebraker et al. The Design and Implementation of INGRES, ACM Transactions Database Systems (TODS), vol. 1, n. 3, Sep. 1976, p. 189-222.

L. Amsaleg, M. Franklin, A. Tomasic, and T. Urhan, Scrambling Query Plans to Cope with Unexpected Delays, Proceedings of the International Conference on Parallel and Distributed Information Systems (PDIS), Miami Beach, Florida, Dec. 1996, p. 208-219.

R. Avnur and J. M. Hellerstein, Eddies: continuously Adaptive Query Optimization, Proceedings of the 2000 ACM SIGMOD International Conference on Management of Data, Dallas, Texas, 2000, p. 261-272.

R. Ahad, K. V. Sapa, and D. McLeod, On Estimating the Cardinality of the Projection of a Database Relation, ACM Transactions on Database Systems (TODS) v. 14, n. 1. Mar. 1989, p. 28-40.

D. Donjerkovic and R. Ramakrishnan, Probabilistic Optimization of Top N Queries, Proceedings of the Twenty-fifth International Conference on Very Large Databases (VLDB'99), Sep. 1999, Edinburgh, Scotland, p. 411-422.

Y.E. Ioannidis and S. Christodoulakis. On the Progagation of Errors in the Size of Join Results, Proceedings of the 1991 ACM SIGMOD International Conference on Management of Data, Denver, Colorado, May 29-31, 1991, p. 268-277.

Z. Ives, Efficient Query Processing for Data Integration, Ph.D. dissertation, University of Washington, 2002.

N. Kabra and D. DeWitt, Efficient Mid-Query Re-Optimization of Sub-Optimal Query Execution Plans, Proceedings of the ACM SIGMOD International Conference on Management of Data, v. 27, ACM Press, 1998, p. 106-117.

G. Lohman, Grammar-like Functional Rules for Represent Query Execution Plan Alternatives, Proceedings of the 1988 ACM SIGMOD International Conference on Management of Data, Chicago, Illinois, ACM Press, p. 18-27.

V. Poosala, Y. Ioannidis, P. Haas, and E. Shekita, Improved histograms for selectivity estimation of range predicates, Proceedings of the 1996 ACM SIGMOD International Conference on Management of Data, p. 294-305.

V. Poosala and Y. Ioannidis, Selectivity Estimation without the attribute value independence assumption, Proceedings of the 23rd International Conference on Very Large Databases (VLDB), Aug. 1997, p. 486-495.

V. Raman, A. Deshpande, and J. M. Hellerstein, Using State Modules for Adaptive Query Optimization, ICDE 2003.

P. G. Sellinger, M. M. Astrahen, D. D. Chamberlin, R. A. Lorie, and T. G. Price: Acess Path Selection in a Relational Database Management System, Proceedings of the 1979 ACM SIGMOD International Conference on Managment of Data, May 30-Jun. 11979, Boston, Massachusetts, p. 23-34.

T Urhan, M.J. Franklin, and L. Amsaleg, Cost-based Query Scrambling for Initial Delays, Proceedings of the 1998 ACM SIGMOD International Conference on Management of Data, p. 130-141.

M. Stillger, G. Lohman, V. Marki, and M. Kandil, LEO—DB2's Learning Optimizer, Proceedings of the 27th International Conference On Very Large Data Bases (VLDB), 2001, p. 19-28.

M. Zaharloudakis, R. Cochrane, B. Lapis, H. Plrahesh, and M. Ursta, Answering Complex SQL Queries Using Automatic Summary Tales, Proceedings of the 2000 ACM SIGMOD International Conference on Management of Data, p. 105-116.

D.E. Simmen, T.Y. Leung, Y. Sun, Optimizing Database Queries Using Query Execution Plans Derived from Automatic Summary Table Determining Cost Based Queries, U.S. Appl. No. 09/502,820, filed May 18, 1999.

\* cited by examiner

| CHECK.OPEN: | BUFCHECK.OPEN: |
|---|---|
| count = 0; | count = 0; |
| CHECK.NEXT: | allocate B of size b; // buffer |
| count++; | for i = 0 to b do |
| r = childStream.next(); | B[i] = childStream.next(); |
| if count > high | if childStream.EOF() |
| call re-optimization; | and i < low |
| if count < low and r = EOF | call re-optimization; |
| call re-optimization; | BUFCHECK.NEXT: |
| else | count++; |
| return r; | if high < count |
| CHECK.CLOSE: | call re-optimization; |
| ∅ | if count < b |
|  | return B[count]; |
|  | else |
|  | return childStream.next(); |
|  | BUFCHECK.CLOSE: |
|  | free B; |

SYSTEM, METHOD, AND COMPUTER PROGRAM PRODUCT FOR PROGRESSIVE QUERY PROCESSING

CROSS REFERENCE TO RELATED APPLICATIONS

The present application is a continuation of U.S. patent application Ser. No. 10/698,828, filed Oct. 31, 2003, entitled "System, Method, and Computer Program Product for Progressive Query Processing now U.S. Pat. No. 7,383,246. The present application is also related to pending U.S. patent application Ser. No. 09/502,820, filed Feb. 11, 2000, entitled "Cost-Based Routing of Automatic Summary Tables" and pending U.S. patent application Ser. No. 09/876,642, filed Jun. 6, 2001, entitled "Learning from Empirical Results in Query Optimization". The foregoing applications are commonly assigned to the present assignee, and are hereby incorporated by reference in their entirety.

BACKGROUND OF THE INVENTION

1. Field of the Invention

The present invention generally relates to query optimization in database management systems. More specifically, the invention selectively re-optimizes a currently running query when cardinality estimation errors indicate the chosen query execution plan is probably sub-optimal.

2. Description of the Related Art

Database management systems (DBMSs) traditionally separate the optimization of a query from its execution. SQL queries are compiled once and the resulting Query Execution Plan (QEP, or just plan) is retained to save re-compilation costs for repeated execution in the future. The plan is stored either in the database (for static compilation [see reference CAK+81]) or in an in-memory cache (for dynamic queries). Most modern query optimizers determine the best plan for executing a given query by mathematically modeling the execution cost for each of many alternative QEPs and choosing the one with the cheapest estimated cost. The execution cost is largely dependent upon the number of rows (the row cardinality) that will be processed by each operator in the QEP, so the optimizer first estimates this incrementally as each predicate is applied by multiplying the base table's row cardinality by a filter factor (or selectivity) for each predicate in the query [SAC+79, Gel93, SS94, ARM89, Lyn88]. The estimation process typically begins with statistics of database characteristics that were collected prior to compilation, such as the number of rows for each table, histograms for each column [IC91, PIH+96, PI97], or sampled synopses [HS93].

Query optimizers determine the best execution plan for any query based on a model of query execution cost that relies on the statistics at the time of compilation. Many assumptions underlie the mathematical models for the cardinality and cost of most queries, such as the currency of the database statistics and the independence of predicates. Outdated statistics or invalid assumptions may cause a query optimizer to choose a sub-optimal. One remedy for outdated statistics is to defer query optimization to execution time, but this necessitates re-optimizing the same query every time it is executed. An even more extreme proposal continually re-optimizes the plan as each row (or group of rows) is accessed [AH00], incurring impractically large re-optimization costs to ensure the best plan based upon the most current information.

While there has been a large body of work in query optimization, most work only addresses static planning of queries at compile-time.

The LEO project [SLM+01] addresses the problem of using query feedback to optimize future queries based on cardinality estimation errors observed during previous query executions. LEO does not provide a methodology for progressively optimizing the currently running query, though.

The DEC RDB system [AZ96] runs multiple access methods competitively before picking one.

There has also been work on parametric optimization (e.g. [CG94]) where different plans are generated for different intervals of the optimization parameters (like memory or selectivities). The main problem with this approach is the combinatorial explosion of the number of plans that need to be generated.

The only commercial DBMS known to incorporate a form of progressive query processing is the Redbrick™ DBMS from IBM Corporation. This DBMS assumes a simple star/snowflake-schema and, for star queries, first computes the intermediate results of all dimension table accesses before deciding (based on the cardinality of the intermediate results) the join method to be used for the star-join. While this product uses progressive re-optimization, it does so only for star-joins. Issues of complex checkpoint placement or generically reusing complex intermediate results are not addressed.

The first work to address general re-optimization of the currently running query is [KD98], where, upon estimation error detection, the SQL statement of the currently running query is re-written to access specially materialized intermediate results as standard table access. [KD98] neither addresses checking in pipelined plans nor elaborates on checkpoint placement. First, [KD98] only re-optimizes hash joins and only if query results are not pipelined. Second, [KD98] rewrites the original SQL query to always reuse the hash join result, which can be sub-optimal. Third, [KD98] explicitly spills hash join results to disk in order to reuse them. This can be prohibitive if the new plan is not significantly better and/or the hash join results are large.

In the Tukwila system [Ives02], re-optimization is done by partitioning the data at each re-optimization point, with a final cleanup phase to combine results from previous phases. The main problems with this approach are: (a) each phase is executed without using the state generated by the previous phases, and (b) the final cleanup uses a specialized pipelined join algorithm rather than invoking the optimizer. The Query Scrambling project [UFA98] also re-optimizes queries, but its focus was on handling delayed sources.

In addition to the limitations discussed above, all of these systems externally re-write SQL queries to re-use the prior results. This is only viable for simple read-only queries. Side effects like update operations cannot in general be rewritten into semantically correct SQL queries after partial execution.

A different approach to progressive query processing is to optimize routing of each tuple separately. Ingres [SWK76] uses a simple scheme where each tuple could be routed independently to nested loop join (NLJN) operators. The Telegraph project generalizes this to a very fine granularity of re-optimization where a separate Eddy operator is used to continually adapt the tuple routing between other operators. As shown in [AH00, RDH02] this mechanism is powerful and can be used to adapt join orders, access paths and join algorithms dynamically. Per-tuple routing gives high opportunity for re-optimization, but imposes an overhead that leads to performance regression when the initial plan does not change. Moreover, the Eddy routes each tuple along a greedy, locally optimal path that does not consider the overall query execution cost. While this works fine for Telegraph's interactive processing metric, a regular optimizer is needed to handle the more common completion time or total work metrics. Integrating the Eddy mechanism with a regular query optimizer has not been addressed in the Telegraph project.

SUMMARY OF THE INVENTION

The present invention is a system, method, and computer program product for accelerating database query processing. The invention determines during execution of a particular query whether continued execution of a particular query execution plan is worthwhile. If continued execution is not worthwhile, then the invention suspends query execution, re-optimizes the query, and restarts query execution with a re-optimized query plan. The invention determines whether a plan is not worthwhile by calculating the amount of query execution remaining, computing the difference between estimated optimization parameter values and actual optimization parameter values, and deciding if a significant amount of query execution remains and significant parameter estimation errors have occurred. If a re-optimization is necessary, then the invention generates a number of alternative query execution plans both with and without using temporary results computed in prior executions, assigns a cost to each alternative plan that reflects plan optimality, and chooses the optimal alternative as the re-optimized query plan.

The invention exploits actual optimization parameter values during the re-optimizing, such as cardinality, memory, communication costs, and I/O operations. The invention reuses materialized partial query results during subsequent re-optimizations and query executions, if the reuse reduces overall computational costs. The invention also selectively returns records at each execution cycle if the records have not previously been returned, and eliminates duplication from the answer set returned in subsequent executions. The invention identifies returned records by a unique record ID assigned during query execution.

The invention places a number of checkpoints in the query execution plan to determine whether estimated optimization parameters are similar to actual optimization parameters. In an embodiment that performs "lazy checking", the checkpoints are placed at points in the query execution plan where an entire intermediate result is materialized before proceeding with further operators in the plan. In an embodiment that performs "lazy check with eager materialization", an explicit materialization is added to the query execution plan, just before the checkpoint, to materialize the intermediate result.

In an embodiment that performs "eager checking without compensation", the checkpoint is pushed below a materialization point for subsequent execution. A modified version of this embodiment performs "eager checking with buffering" by buffering rows until the checkpoint is evaluated, enabling pipelining with some delay. If the temporary space is exhausted, the invention triggers a re-optimization instead of signaling an error. Finally, a fifth embodiment performs "eager checking with deferred compensation" by transferring each row to its parent operator in a pipelined manner, storing identifiers of all rows returned on a side table using an INSERT plan operator just below the return operator, then compensating for returned row results by executing an anti join between the side table and a new result stream.

These and other aspects and objects of the present invention will be better appreciated and understood when considered with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which:

FIG. 7 is a diagram of an implementation of the check (CHECK) and buffered check (BUFCHECK) operators through an open/next/close model, according to an embodiment of the invention;

DETAILED DESCRIPTION OF THE INVENTION

Figure 1:
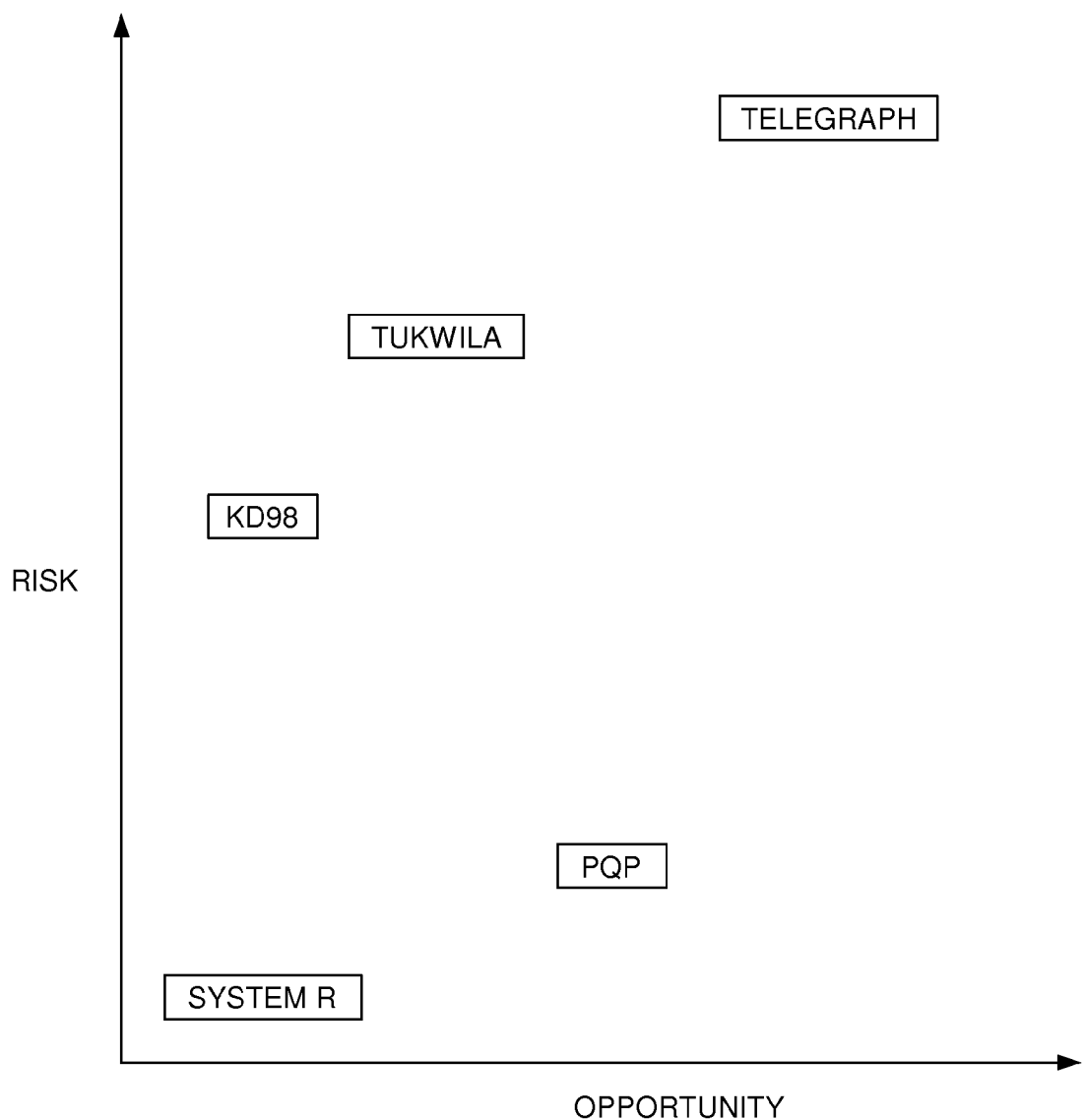
FIG. 1 is a diagram of the risk/opportunity tradeoff of various re-optimization schemes.

The present invention is a method, system, and computer program product to make query processing more robust in the face of optimization errors, and is termed Progressive Query Processing (PQP). The invention validates the statistics and assumptions used for compiling a query as the query is executed and, when necessary, progressively re-optimizes the query in mid-execution, based on the knowledge learned during its partial execution. The invention selectively places one or more CHECK operators in a query execution plan to validate the optimizer's cardinality estimates against actual cardinalities. Errors beyond a threshold trigger re-optimization, in which the optimizer decides whether the old plan is still optimal and whether to re-use previously computed results. The invention has been implemented using a prototype version of the DB2™ DBMS by IBM Corporation, but can be implemented in other databases. An experimental evaluation of the invention using TPC-H queries shows substantial opportunities for re-optimization, while adding only negligible cost, making query processing more robust, and accelerating problem queries by orders of magnitude.

The invention serves as a practical compromise between the extremes of static compilation and continual compilation. The invention provides a plan "insurance policy" by lazily triggering re-optimization of the currently running query only when cardinality estimation errors indicate likely sub-optimality of the chosen QEP. It does this by adding to a traditional QEP one or more checkpoint operators, which compare the optimizer's cardinality estimates with the actual number of rows processed thus far, and trigger re-compilation if a pre-determined threshold on the error is exceeded. If the optimizer's estimates are fairly accurate, the only overhead incurred by the invention is the added CPU cost of counting the rows at each checkpoint and comparing them to the threshold. Only if the optimizer has grossly misestimated the cardinality at some checkpoint, and thus is executing a plan that is likely to have disastrous performance, will the cost of re-optimization and re-execution be incurred. By treating the results computed up to the checkpoint as a temporary materialized view, the optimizer can exploit both the count of its rows during re-optimization and the reuse of those results during execution.

Alternative check-pointing schemes that impose different levels of overhead are explored, and the tradeoffs in placing these checkpoints at different places in the QEP are investigated. The invention also introduces specialized check-pointing schemes that permit re-optimization of pipelined plans without erroneously returning duplicate rows, a consideration implicitly ignored by prior re-optimization schemes.

Risk-Opportunity Tradeoffs

The invention uses re-optimization to consecutively refine a query plan, with the goal of improving QEP quality and performance. There are three dimensions along which one can evaluate a re-optimization scheme:

Risk—the chance that work may need to be re-done. The wasted work is the increased execution time (including communication costs and I/O operations) due to re-optimization, in the case where re-optimization does not change the QEP.

Reward—the benefit gained by re-optimization, i.e., the execution time of the old plan minus the execution time of the new plan Opportunity—the aggressiveness of the re-optimization scheme, and is loosely measured by the number of chances for re-optimization during query execution. Opportunity is directly correlated to risk; highly opportunistic schemes also have high risk of slowing down query execution.

FIG. 1 depicts the risk vs. opportunity environment in which various query processing systems operate. Many of the related projects on adaptive query processing focus on reward and opportunity when the plan does change, and ignore the risk when the plan does not change. In contrast, an important concern for the present invention in a commercial system is to be Hippocratic, i.e., to avoid severely impacting query performance of the normal operation without estimation errors. Since re-optimization is necessary only in exceptional situations, it must not result in query performance regression whenever re-optimization does not take place, which is the normal case. Therefore, this application focuses on the opportunity and risk metrics. The reward is primarily a function of the error sensitivity of the optimizer, i.e. how sub-optimal does a plan become for a given error in estimation.

Progressive Query Processing

A checkpoint is an operator in a QEP that has no relational semantics, but acts as an assertion to ensure that the cardinality estimate for the plan operator below the checkpoint is reasonably close to the actual cardinality, which is tested during query execution. Checkpoints are manifested in QEPs by CHECK operators. Each CHECK operator has a check condition parameter, which is a range of cardinalities [l, u]. The cardinality range defines when the check will be successful and is dependent on the cardinality estimate as well as remainder of the QEP above CHECK. A check is successful when the actual cardinality a is within the range defined by the check condition, i.e., $a \in [l, u]$. If checking succeeds, query processing will continue normally. Otherwise, the current execution of the query will be terminated and re-optimization is triggered with the goal of determining a better QEP, using the better statistical information observed during the partial query execution until the check condition was violated. The re-optimized plan can in principle reuse all materialized intermediate results from the prior executions, though in some cases it may be preferable to discard (some of) them.

Figure 2:
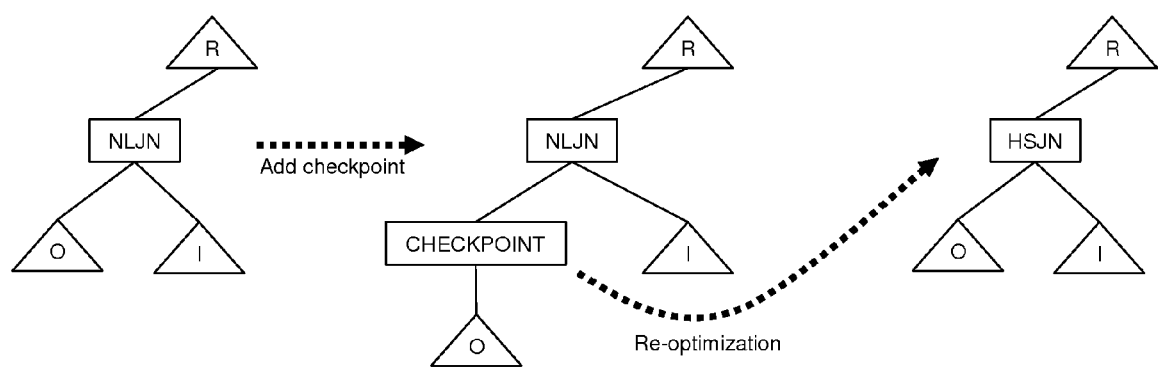
FIG. 2 is a diagram of the process of checking the outer of a (index) nested loop join, according to an embodiment of the invention.

An example of checkpointing is given in FIG. 2. The QEP in the left part of FIG. 2 joins the outer (O) and inner (I) sub-plans using the (index) nested-loop join (NLJN) method before processing the remainder of the plan. The choice of the operator joining O and I depends heavily on the cardinality estimate for the result of the sub-plan O. Usually the optimizer will prefer the NLJN for joining O and I, when the cardinality for O is relatively small, since the NLJN is the best method for small outer cardinalities. If the cardinality of O is much larger than estimated, another join method, such as hash-join (HSJN) or merge-join (MGJN), is much more efficient and thus preferred by the optimizer.

Since a wrong join method can result in performance degradations of orders of magnitude, adding a checkpoint to the outer of a NLJN helps to prevent the execution of sub-optimal plans and thus bad query response times. The checkpoint added above O in the middle part of FIG. 2 ensures that the NLJN method is optimal not only for the cardinalities estimated at compile time, but also for the actual cardinalities at runtime. When the check condition is violated, re-optimization of the query is triggered, which in the right part of FIG. 2 replaces the NLJN with a more suitable join method, the hash join (HSJN).

A DB2 Prototype of PQP

DB2 consists of a SQL compiler, which parses, rewrites, optimizes, and generates runtime code for a query, and a runtime system, which interprets and executes the runtime code created by the SQL compiler. The query rewriter and optimizer determine the best physical QEP for any given declarative SQL query. The query rewriter is the rule-based component of the optimizer, using heuristic rules to transform a query graph into an equivalent query graph. The cost-based optimizer generates a huge set of alternative QEPs, determines the best plan according to its cost model, and hands this best plan to the code generator for creating the executable program for the query.

Figure 3:
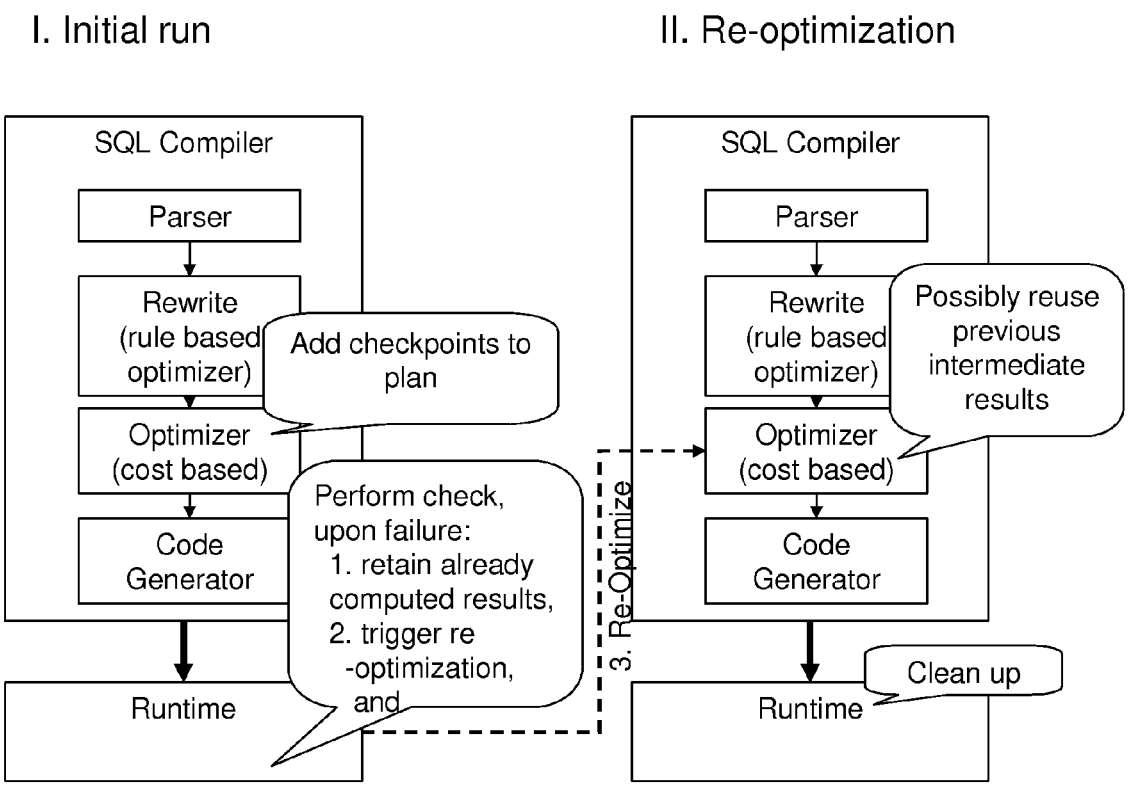
FIG. 3 is a diagram of the progressive query processing architecture, according to an embodiment of the invention.

Implementation of the invention in a DBMS requires enhancing the optimizer and runtime components. Logic to add checkpoints to a query execution plan is incorporated into the optimizer. The runtime system is enhanced by logic for checkpoints. When a checkpoint is processed, the cardinality estimate used by the optimizer is compared to the cardinality actual observed by the runtime system. If a significant estimation error is detected, the runtime system retains already computed intermediate results together with their statistics for further use and triggers re-optimization of the currently running query by recursively calling the query optimizer. In FIG. 3 the initial run (partial query execution until the check condition triggered re-optimization) and the re-optimization run of a query are distinguished for explanatory purposes. The re-optimization run could again add checkpoints to the new QEP and become the initial run for a subsequent re-optimization.

The better statistical knowledge available in the re-optimization run because of the previous execution helps to avoid some estimation errors from the previous run, specifically the error on the intermediate result that triggered re-optimization. After compilation and execution of the query in the re-optimization run, cleanup actions are necessary to remove the intermediate results and free locks on tables and indexes used during the previous run.

Error Checking & Re-Optimization

As discussed before, the main metrics to evaluate a checkpoint are the risk and opportunity of re-optimization at the checkpoint. An additional metric is its usability in pipelined plans, i.e., QEPs that do not have any operators that block tuple processing, but stream all rows directly to the user in order to reduce the time that user has to wait before seeing the query first results. Re-optimization in this case might be triggered after some results have already been returned. Without buffering or compensating for those rows, re-optimization will result in unexpected duplicates, which is inconsistent with the semantics of the original query.

We now present five embodiments of the present invention, each essentially a flavor of checkpoints to meet these challenges: lazy checking (LC), lazy checking with eager materialization (LCEM), eager checking without compensation (ECWC), eager checking with buffering (ECB), and eager checking with deferred compensation (ECDC). The first three apply only to non-pipelined plans, and the last two apply to all plans.

Lazy Checking

The first embodiment of the invention, termed lazy checking (LC), piggybacks on materialization points, i.e., points in a QEP where an entire intermediate result is materialized before proceeding with further operators of the plan. Examples for such materialization points in DB2 are:

a) the SORT operator (which sorts its input, e.g. for a sort-merge join or group-by), b) the TEMP operator (which creates a temporary table, e.g. for caching subquery results), and c) the build side of the hash join operator.

Placing a checkpoint above a materialization point means that the cardinality of the materialization point will be checked exactly once, that is, after the materialization has been completed. Materialization points are ideal checkpoints, for two reasons. First, the checkpoints need no compensation because no results could have been output before re-optimization. Second, the materialization creates intermediate results, which can be reused by the re-optimized query.

Figure 4:
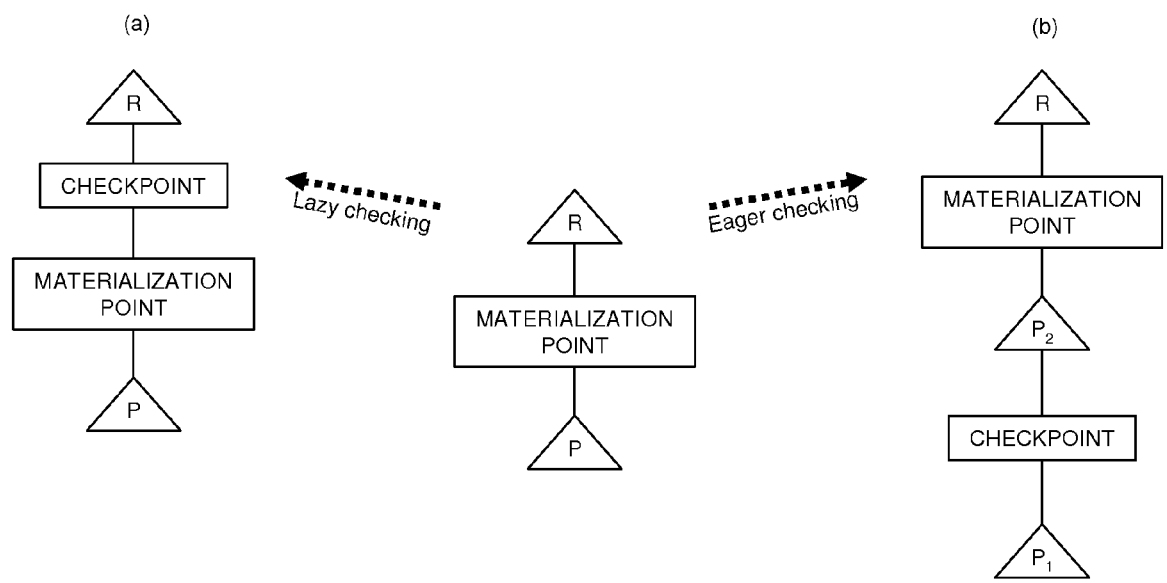
FIG. 4 is a diagram of the process for lazy checking (LC) and eager checking without compensation (ECWC), according to embodiments of the invention.

Lazy checking is depicted in the left part of FIG. 4, where the QEP in the middle of the figure processes its sub-plan P and materializes the result of P at a materialization point. After materialization, the result is further processed by sub-plan R. The left part of the figure shows how PQP adds a lazy checkpoint above the materialization point.

Lazy Check with Eager Materialization

Although materialization points allow very efficient re-optimization, they may not occur frequently. If one wants to check above a QEP node and there is no materialization, an alternative approach is to explicitly add a CHECK-MATERIALIZATION pair that first materializes the result and blocks any pipelining. Upon complete construction of the materialized intermediate result, the CHECK condition is evaluated. This second embodiment is termed Lazy Checks with Eager Materialization (LCEMs).

LCEMs cannot be added recklessly because of the extra overhead of materialization. Instead, the following heuristic can be used. Among the various join operators in the plan, merge joins have materialization on both inputs, and hash joins have materialization on the build side. So it is mainly the various varieties of NLJN that may have no materialized inputs and therefore need LCEMs. Therefore the heuristic is to add LCEMs on the outer side of every NLJN (unless the outer stream already has a materialization operator).

For the common case of equi-joins, the fact that the optimizer picked NLJN over HSJN or MGJN suggests that the cardinality of the outer is small (because the cost of NLJN is roughly the outer cardinality times the cost of probing or scanning the inner). If the optimizer's cardinality estimate was correct, materializing the outer will not be too expensive, as verified experimentally.

The [KD98] approach of spilling hash join results to disk is another kind of LCEM. The main problem is that this LCEM may be too late; hash joins are often the expensive parts of a query, and there may not be many opportunities to re-optimize after them. From a risk perspective, hash join results are often quite large, and spilling them may be expensive.

Eager Checking (ECWC, ECDC, ECB)

A main weakness of lazy checking is that the materialized result may be too large, and it may be suboptimal to compute them at all. Sometimes this can have serious implications: if the intermediate result cardinality was badly underestimated, there may not be enough temporary space to hold the materialized result! Eager Checks are an aggressive alternative that re-optimize without waiting for materialization, thereby reacting faster to cardinality errors. Clearly, results could have been output to the user by this time, and the invention must compensate for these. Furthermore, eager checks may result in throwing away work and thus are of higher risk than lazy checks. There are three flavors of eager checking:

Eager Checking without Compensation

The third embodiment of the present invention is an Eager Check without Compensation (ECWC), which is a checkpoint that has a materialization point as its ancestor, i.e., which is executed later, and therefore needs no compensation. The right part of FIG. 4 shows how a checkpoint is pushed down below a materialization point, breaking the sub-plan P into the two sub-plans $P_1$ and $P_2$ and performing eager checking on $P_1$.

More general eager checks take place in pipelined (sub) plans, and thus may require compensation in order to avoid false duplicates. They are of two kinds:

Eager Check with Buffering

The fourth embodiment of the present invention is an Eager Check with Buffering (ECB), which is a combination of a checkpoint and buffer. It buffers the rows passing through it until it is confident that the check will either fail or succeed. It thus supports pipelining, though with a delay. Specifically, an ECB with a threshold range $[0, b)$ or $[b, \infty]$ accepts and buffers up to b rows like a valve. A check with range $[0, b)$ will succeed (and a check with range $[b, \infty]$ will fail) when its child in the QEP returns EOF and the buffer contains less than b rows at this time. A check with range $[0, b)$ will fail (and a check with range $[b, \infty]$ will succeed), when the bth row is inserted into the buffer. If the check fails, re-optimization is triggered. If the check succeeds, pipelined execution continues. The parent operator above the checkpoint will first process the rows from the buffer. If the buffer is exhausted for a [b, ∞] checkpoint, further rows are requested from the operator below the checkpoint.

Figure 5:
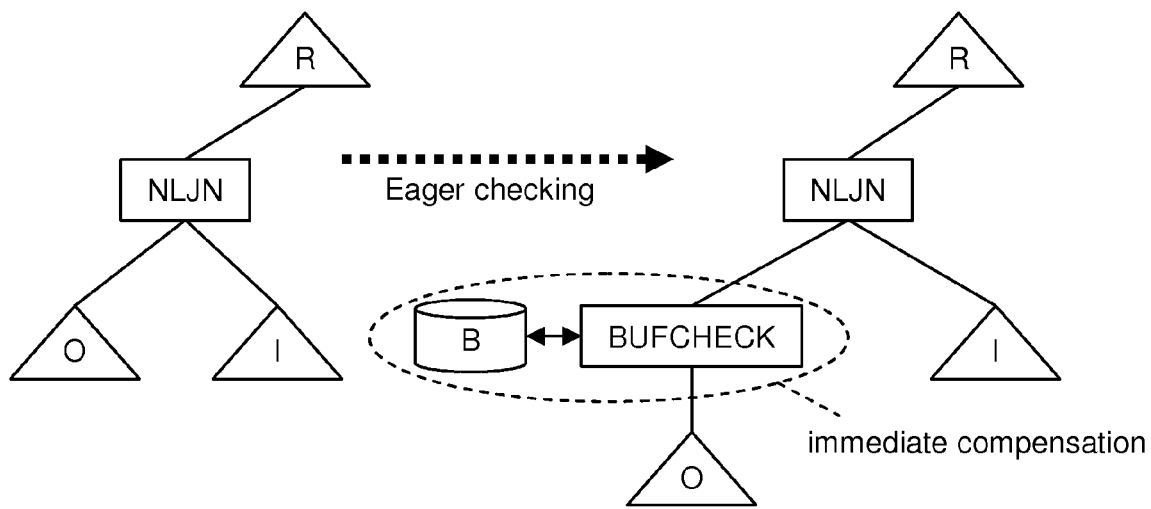
FIG. 5 is a diagram of the process for eager checking with buffering (ECB), according to an embodiment of the invention.

ECBs can be implemented with a buffered check (BUFCHECK) operator. FIG. 5 illustrates a BUFCHECK with buffer B on the outer sub-plan O of a (index) nested-loop join. This buffer blocks the join until either the buffer has been filled or O finishes. ECB is especially useful for checking the outer cardinality of a NLJN, because pipelining can be blocked for a short while in order to ensure that NLJN is the proper join method. An ECB can also help SORT or HSJN builds, if these run out of temporary space when creating their results, by re-optimizing instead of signaling an error.

ECB and LCEM

Note that an ECB can easily morph into an LCEM by simply waiting to re-optimize (on a check failure) until its input is exhausted. The ECB can dynamically make this decision of re-optimizing now or waiting till the end, and analyze the relative risks of the two approaches, as discussed later.

Eager Check with Deferred Compensation

The fifth and preferred embodiment of the present invention is called Eager Check with Deferred Compensation (ECDC). To avoid even delaying pipelining, this scheme transfers each row to its parent operator in a pipelined manner. In order to allow for compensation in case of re-optimization, the identifiers of all rows returned to the user are stored on the side. The re-optimized query compensates for these prior results by doing an anti join between the side table and the new result stream.

Figure 6:
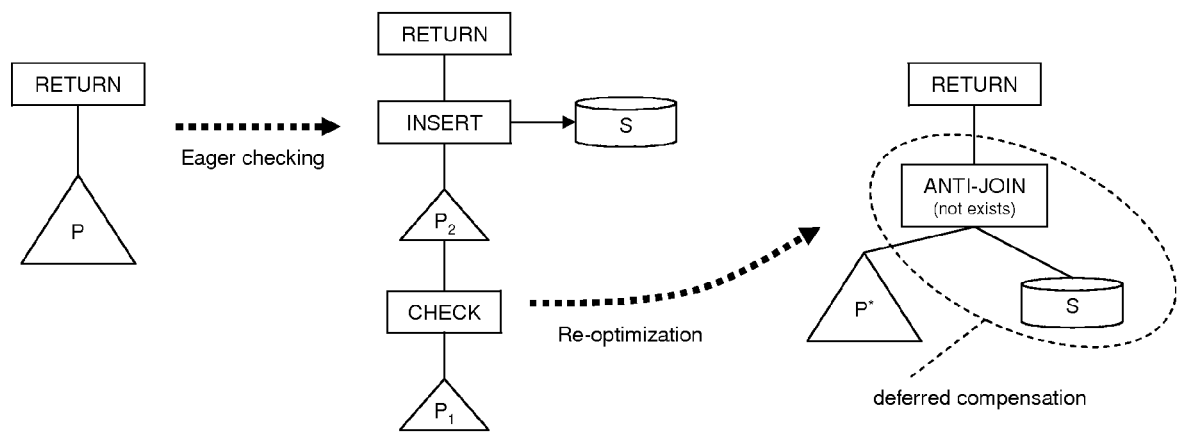
FIG. 6 is a diagram of the process for eager checking with deferred compensation (ECDC), according to an embodiment of the invention.

ECDC is depicted in FIG. 6, where a checkpoint is inserted into the pipelined QEP P. The RETURN plan operator in FIG. 6 denotes the operation that returns rows to the user. In the middle part of the figure the pipelined QEP P has been broken up into the sub-plans $P_1$ and $P_2$, and a checkpoint has been inserted between the two sub-plans. Because of deferred compensation, the checkpoint does neither delay pipelining nor buffer any rows. In order to enable deferred compensation, an INSERT plan operator is inserted just below the return operator. INSERT uses a temporary table S to remember the row IDs of all rows that have been returned to the user. These IDs may need to be constructed if the row has been derived from a base table. If re-optimization is triggered, the optimizer adds an anti join (set difference) plan operator on top of the re-optimized QEP P* in order to compensate for already returned rows from the initial run of the query.

FIG. 7 shows the implementation of the check (CHECK) and buffered check (BUFCHECK) operators through an open/next/close model. The implementation of check can be simplified if the DBMS maintains counters for each plan operator. In this case, the check operator can directly refer to the counters of the operator below CHECK. Similarly, if the check operator is only placed above a materialization point, checking can be optimized to be only executed once (i.e., after the materialization has completed) and refer to the counter of the materialized intermediate result.

Risks and Opportunities for each Flavor of Checkpoint

Lazy checks (LCs) impose the least risk during query processing because their input is materialized and can be reused. But their opportunity is limited to materialization points in the plan.

Lazy checks with Eager Materialization (LCEMs) impose the additional overhead of materializing results, and could thus be more risky. Thus, the present invention places LCEMs only on the outer side of (index) nested-loop joins, where cardinalities are likely to be small. By introducing these artificial materialization points, LCEMs provide greater re-optimization opportunities.

The main problem with LCs and LCEMs is that they wait for full materialization before re-optimizing. This can be bad if the result is much larger than expected; LCEMs are especially affected, because there the materialization is artificially introduced.

Eager checks with Buffering (ECBs) avoid this problem by re-optimizing even during materialization. The penalty is that the sub-plan being materialized has to be re-run, modulo other materialization points within it. In general we want to couple both approaches, placing an LCEM above an ECB so that the ECB can prevent the materialization from growing beyond bounds. The relative risk of triggering re-optimization from the ECBs vs. the LCEM depends on the relative costs of re-running the outer and materializing the results. We later study when it is worthwhile to trigger ECB re-optimization.

ECWC and ECDC give much greater opportunities for re-optimization. ECWC can be placed anywhere below materialization points. ECDC works even in pipelined plans and requires only one buffer for the entire query, regardless of how many checkpoints exist in the QEP. Because of the anti-join post-processing of the re-optimized query, ECDC reduces the overhead of the initial run of the query and puts more cost to re-optimization, which can be good if re-optimization is rare. As a penalty for this virtually unlimited opportunity for re-optimization, ECWC and ECDC have high risk, because they throw away work.

Summary of Check Placement

Table 1 summarizes the five embodiments of checkpoints and the heuristics for placing them in a plan. To avoid slowing the regular plan generation, all checkpoints are added to the plan in the optimizer's "post-pass" phase, i.e., after the optimal plan has been chosen.

TABLE 1

| Checkpoint Type | Placement | Risk | Opportunity |
| --- | --- | --- | --- |
| Lazy Check (LC) | CHECK Above materialization points | Very Low - only context switching | Low, only at materialization points |
| Lazy Check with Eager Materialization (LCEM) | CHECK-Materialization pairs on outer of NLJN | Context Switching + materialization overhead | Materialization points and NLJN outers |
| Eager Check with Buffering (ECB) | BUFCHECK on outer of NLJN. | Lower than LCEM till SafeEagerThreshold, gradually increases afterwards | Can reoptimize anytime during materialization |
| Eager Check without compensation (ECWC) | CHECK below materialization points | High - may throw away arbitrary amount of work during reoptimization | Anywhere below a materialization point |

TABLE 1-continued

| Checkpoint Type | Placement | Risk | Opportunity |
| --- | --- | --- | --- |
| Eager Check with deferred compensation (ECDC) | CHECK and INSERT before reoptimization; anti-join afterward | High - may throw away arbitrary amount of work during reoptimization | Anywhere in the plan. |

Besides the conditions for choosing individual checkpoints, there are some broad rules determining whether any checkpoint is useful at a certain node in the plan. First, the remainder of the plan (above the checkpoint) must depend on the cardinality at the checkpoint. The invention uses a simple heuristic, that, if there are no joins above a certain plan node then that part of the plan is independent of cardinality, and need not be safeguarded by a checkpoint. Second, there must exist alternative query plans for the part above the checkpoint; this information is obtained from the optimizer itself.

More generally, a checkpoint is useful only if the cardinality estimate at that point may be erroneous. In the absence of a detailed confidence model for cardinalities, a heuristics reliability measure is the number of times assumptions can be used instead of actual knowledge in order to compute an estimate. More sophisticated methods consider an estimate as a probability distribution [DR99] or carry out a sensitivity analysis and thus can give error ranges which define the reliability of an estimate.

Exploiting Intermediate Results

In order to efficiently re-optimize, already computed intermediate results should be exploited whenever possible. The materialized view (MV, also known as automated summary table/AST or materialized query table/MQT in DB2 [ZCL+00]) mechanisms of the query compiler of a DBMS are adapted to easily and elegantly integrate the invention with intermediate result exploitation.

During the initial compilation of a query, the post pass of the optimizer adds checkpoints to the QEP based on the reliability of an estimate as well as the potential harm of an estimation error. During runtime, the implementation of the check operator will detect estimation errors and trigger re-optimization if necessary. Before recursively calling the SQL compiler, the check operator promotes each intermediate result to a temporary materialized view, having the cardinality of the intermediate result in its catalog statistics. Thus, exact cardinalities are available for all intermediate results for re-optimization. During re-optimization the optimizer will also consider table accesses to the materialized views as an alternative sub-plan that is compared to sub-plans that re-create intermediate result from scratch. The optimizer could even create an index on the materialized view before re-using it if worthwhile.

Overhead Reduction

To minimize the overhead and thereby risk of re-optimization, these intermediate results are not written out to disk. Rather, the temporarily materialized view has a pointer to the actual runtime object for the scan from the current execution. If this view is reused, the fields in this in-memory object are modified to satisfy the new plan, e.g. the internal IDs for each column of this scan may change when the plan changes. (Another advantage of this approach is that the scan can in principle be restarted from where it left off, thereby avoiding the need for compensation in pipelined plans.)

Matching Saved Results

There are three possible entry points for the recursive call of the SQL compiler: (a) from the parser, (b) calling query rewrite (b), or (c) calling the query optimizer. If the SQL compiler or query rewrite are called, the standard materialized view matching mechanisms of the DBMS will have to determine if the materialized view created from the intermediate result matches some part of the query. This approach is very simple and requires no changes to the SQL compiler. Since the intermediate result always matches some part of the query by construction, a more efficient way is to mark the materialized view as matched during the execution of the CHECK operator itself and then call the query optimizer directly.

In either case, once the intermediate results have been matched to the query, the query optimizer will consider the materialized views as alternative sub-plans to the original plans and use its cost model to determine which sub-plan to choose. When the re-optimized query has been executed completely, the runtime system has to remove these temporarily materialized views to free up memory.

Considerations for Reusing Saved Results

If the plan under the checkpoint performs a side-effect (insert/delete/update), the intermediate results must always be matched and reused, otherwise the side-effect will be applied twice.

Intuitively it seems that intermediate results should always be reused rather than be thrown away, but this is not always true. A wrong initial choice of join order, for instance, might create a prohibitively large intermediate result that would have been avoided with a different join order. Moreover, many cardinality errors are due to violations of the independence assumption between predicates, and are therefore underestimates, leading to larger-than-expected intermediate results. Using this intermediate result could incur a much higher cost than restarting from scratch. Instead of always using intermediate results, the invention gives the optimizer the choice whether or not to use the intermediate results. This choice is based on the optimizer's cost model, which is enhanced by better cardinality and statistics information obtained from the previous partial execution of the query.

Figure 8:
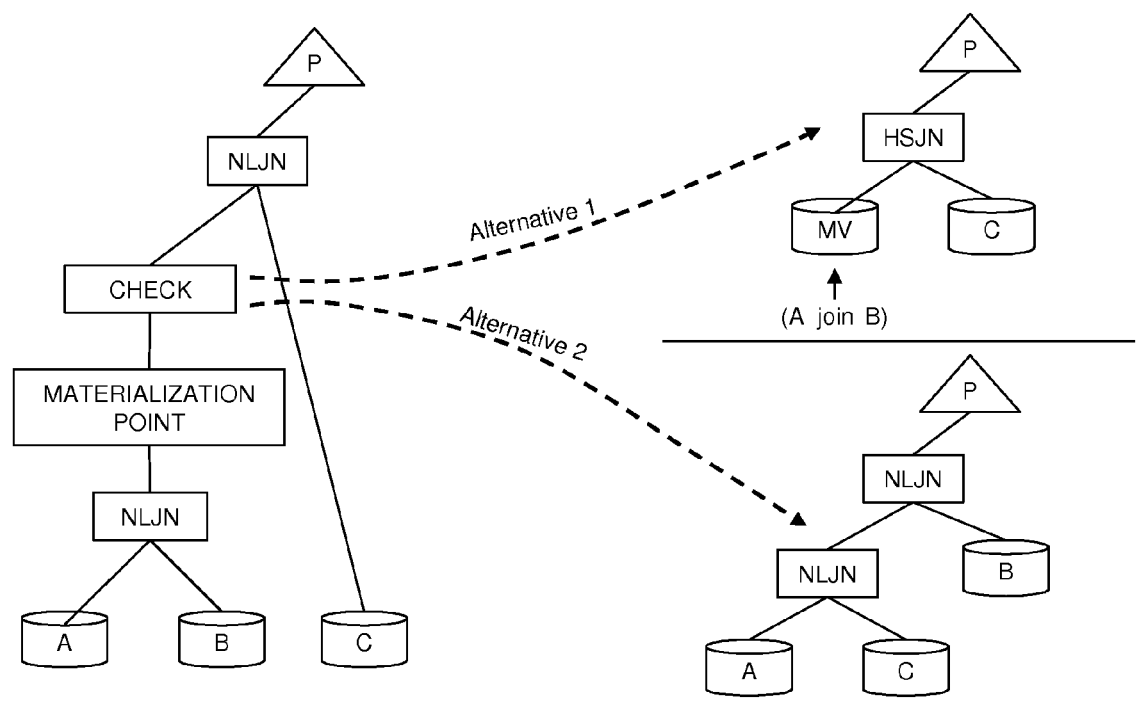
FIG. 8 is a diagram of two alternatives considered in re-optimization, according to an embodiment of the invention.

The right part of FIG. 8 shows two alternatives QEPs that the query optimizer will consider, among other alternatives, when re-optimizing the QEP in the left part of FIG. 8 at the CHECK. Alternative 1 reuses the materialized view created from the intermediate result at the materialization point below the check operator, whereas Alternative 2 uses a different join order and does not reuse the previous work. The optimizer's cost model will decide which alternative to choose for the re-optimized query.

Since materialized views can also store detailed statistics beyond the cardinality of the view, it is possible to provide even more detailed statistics to the optimizer (e.g., the lowest and highest key for a column) for a relatively low overhead at materialization point creation. Moreover, it is also possible to obtain cardinality, or with little extra cost even more detailed statistical information, for all nodes of a QEP, not only for the materialization point. This detailed statistical information is then fed back into subsequent re-optimization phases. A detailed description of the mechanisms which allow the DB2 optimizer to learn from prior execution steps is described in more detail in [SLM+01].

These learning mechanisms are particularly important to integrate into a progressive query processing system given that the optimizer must decide in a cost-based fashion between QEPs that reuse materialized partial results and those that do not. If the statistical input to QEP operators exploiting materialized view results was different than that provided to operators taking equivalent subplans as input, cost bias could occur.

In general, the distribution statistics (characterizing the output) of two subplans performing equivalent relational work (e.g. access equivalent tables and apply equivalent predicates) must be equivalent in order to avoid cost bias. The DB2 optimizer has sophisticated cardinality estimation algorithms for ensuring that statistical information garnered from a variety of sources is exploited in an even-handed way. The invention is able to take advantage of these existing mechanisms by simply mapping statistics measured during a prior execution step to the existing internal statistical tables input to these algorithms.

Temporarily materialized views need not even be removed synchronously, when processing of the query creating the materialized view has completed, but can remain available until either at least one of the tables contributing to a materialized view is updated or new memory/disk space is needed for other materialized views. This lazy removal of intermediate results provides for a very simple caching mechanism, which comes for free and will increase overall query performance if several queries share common sub-expressions and thus use the same intermediate result.

Performance Analysis

The efficiency of the invention was evaluated experimentally. The effectiveness of re-optimization in terms of the risk of a particular kind of checkpoint vs. the opportunities that it provides (for re-optimizing the query) is investigated. Out of the five flavors of Table 1, LC, LCEM and ECB checkpoints are analyzed along both these domains. The other two flavors, ECNC and ECDC, can be placed almost anywhere in the query plan, but can result in wastage of arbitrary amounts of work and so these two high risk high opportunity flavors are not quantitatively analyzed. A few examples of the rewards of re-optimization in terms of the kinds of plan changes encountered are also presented.

Implementation Status

The current prototype of the present invention implements LC, LCEM, ECB and EC checkpoints. For code simplicity, BUFCHECK is implemented by placing a TEMP over a CHECK, with the TEMP acting as buffer. This also simplifies the risk evaluation for ECB. As mentioned before, materialized results from TEMP and SORT operators are reused by copying only pointers. The current implementation does not reuse hash join builds.

The TPC-H benchmark queries are used for the experiments. All experiments were conducted on a lightly loaded Power PC with a Power3-II 375 Mhz CPU, 4 MB L2 cache, 3 GB real memory, 2 GB swap file, running a prototype version of DB2.

Risk of Re-Optimization

The overhead that PQP introduces on normal query execution is of interest. Therefore the experiments are not designed to show any performance improvement, but to highlight the additional cost if the invention does not result in a QEP change. The TPC-H dataset is used explicitly because it has uniform data distributions and almost no column correlations—so re-optimization does not change the plans. LC, LCEM, and ECB checkpoints are separately added to plans as in Table 1, and the total execution times are measured with and without re-optimization.

Risk of LC Checkpoints

Since LCs are placed just above existing materializations, the only overhead should be for context switching and re-invoking the optimizer. Hash-joins are explicitly disabled for this experiment so that the optimizer generates lots of materialization points so that the LC overhead can be studied extensively. (Inserting LCs on the build side of hash-joins has also been tried, but resulted in significant re-optimization overheads with the current implementation since it does not reuse the build. Thus, this option for LCs will be exercised only after the coding of build side reuse is completed.)

Figure 9:
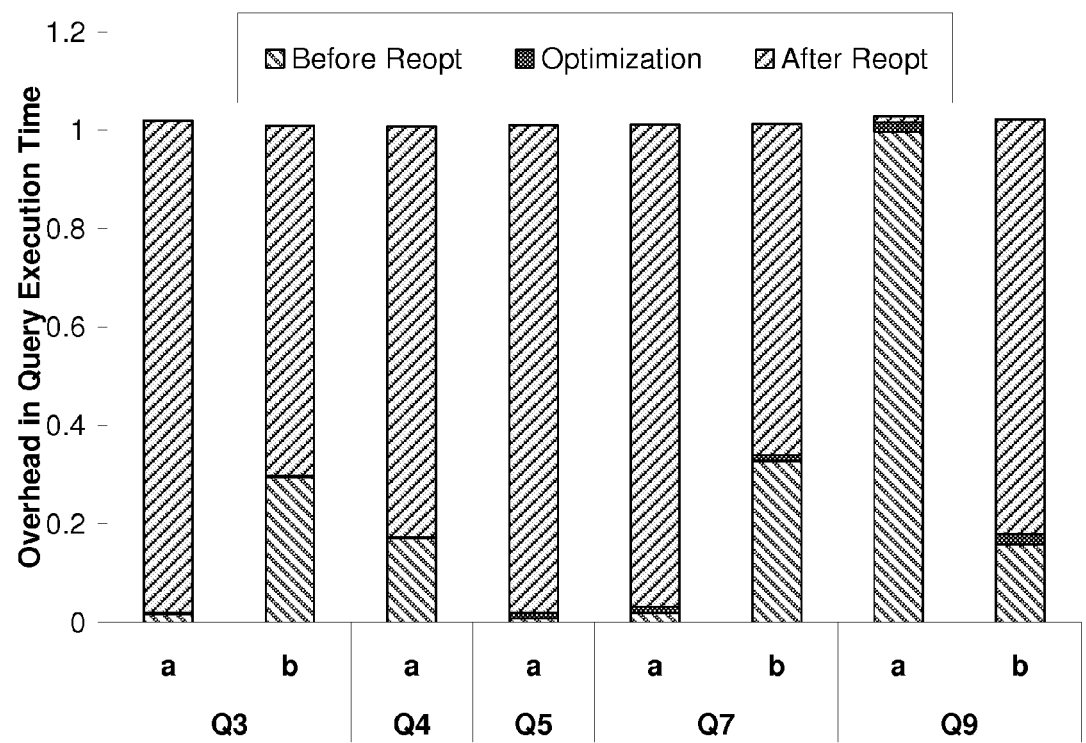
FIG. 9 is a plot of the overhead of LC re-optimization, according to an embodiment of the invention.

FIG. 9 plots the execution time for selected TPC-H queries. Each query is run once without triggering re-optimization and once or twice with re-optimization, and plots of the overhead of re-optimization normalized by the regular execution time of each query are shown. For queries Q3, Q7, and Q9, the QEP had multiple checkpoints. The bars denoted by a and b in FIG. 9 show two separate executions of these queries with re-optimization triggered from different checkpoints. The left slanting region is the component of execution time before re-optimization, the right slanting region is the component after the re-optimization, and the small gap between them (almost invisible) is the time taken for the additional optimization at the checkpoint. The overhead that the invention introduces is negligible, about 2-3%.

Risk of LCEM Checkpoints

Figure 10:
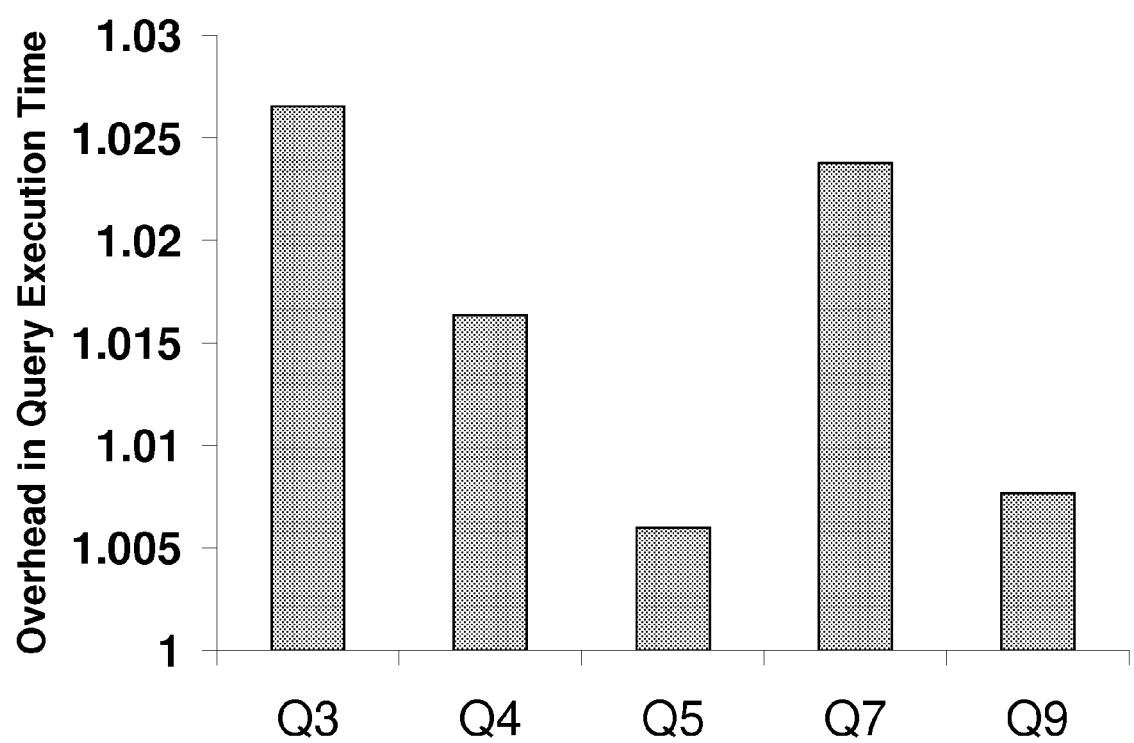
FIG. 10 is a plot of the cost of lazy checking with eager materialization (LCEM), according to an embodiment of the invention.

The next experiment tries a more daring approach to re-optimization. All joins are re-enabled, and we proactively add LCEM check/materialization points on the outer of all NLJNs. Then TPC-H queries are run without any re-optimization. FIG. 10 plots the increased cost because of adding materialization points normalized by the regular total execution time. The negligible overhead in FIG. 10 clearly validates the hypothesis that if (index) nested-loop join is picked over hash join, the outer is small enough to be aggressively materialized.

Risk of ECB Checkpoints

Recall that ECB checkpoints are also placed below materialization operators on the outer side of (index) nested-loops joins, and can fire at any time during the materialization. The key question of how early to re-optimize depends on risk: the risk of firing now versus the risk of waiting until full materialization.

Figure 11:
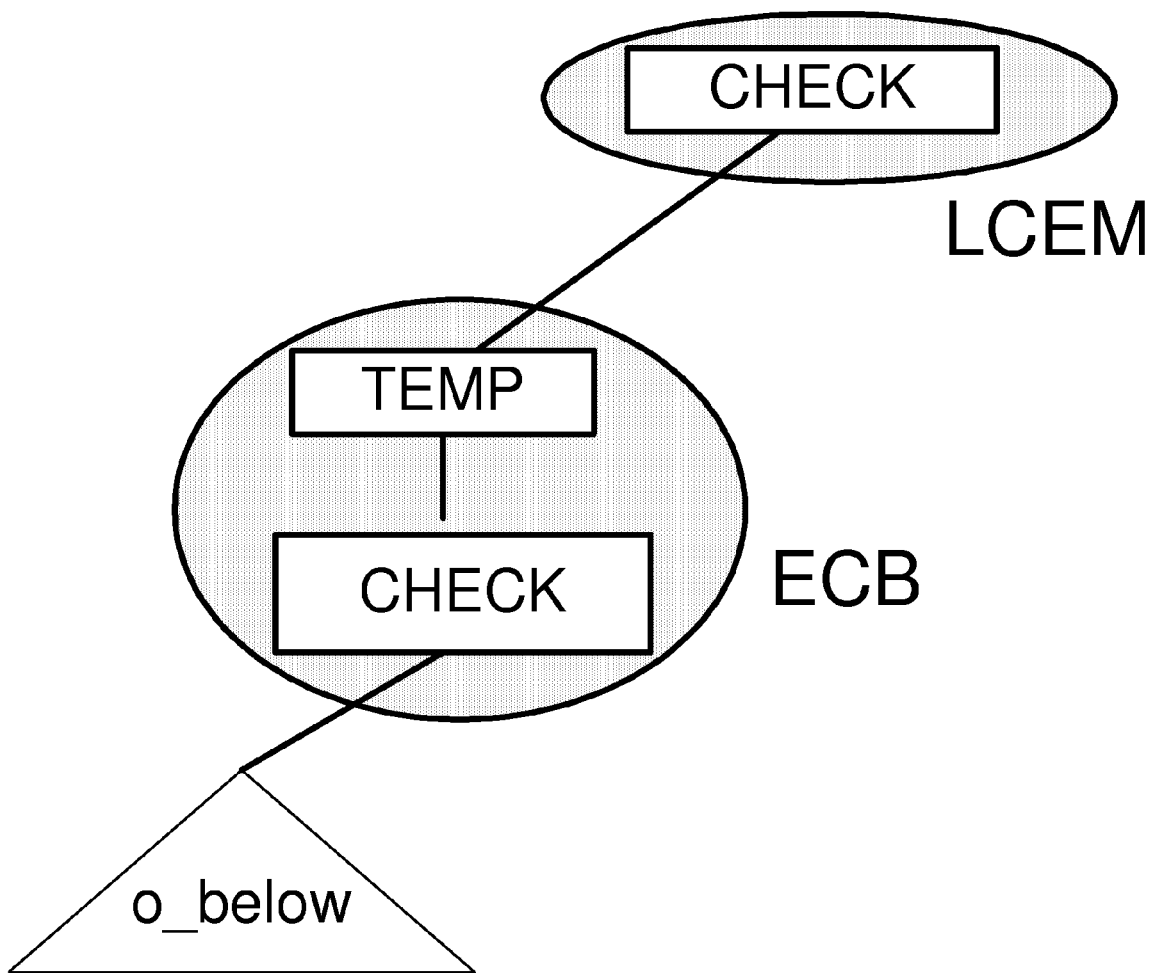
FIG. 11 is a diagram of ECB and LCEM checkpoints, according to an embodiment of the invention.

Consider FIG. 11, with a materialization flanked by an ECB and an LCEM. During optimization, DB2's optimizer models the cost of the subtree rooted at each operator o as FirstTupleCost(o)+card(o)*ICost(o), where ICost(o) is incremental per-tuple cost of o and card(o) is the expected number of tuples output by o.

If ECB is fired (triggers re-optimization) after reading $\alpha$*card tuples and the plan does not change, the wasted work is $\alpha$*card(o_below)*ICost(o_below). FirstTupleCost(o_below) is ignored because it typically corresponds to work that will be saved and reused via materialization points in the sub-tree o_below.

On the other hand, the risk of not firing the ECB and waiting till the LCEM is that $(1-\alpha)$*card additional tuples have to be materialized, with a wastage of $(1-\alpha)$*card(o_below)*(ICost(o_mat)-ICost(o_below)). Note that the cost of performing o_below on these remaining tuples is not a risk; it is assumed the plan doesn't change on reoptimization. Thus an ECB firing incurs less overhead than waiting till the LCEM if the ECB is fired before a fraction SafeEagerLimit=1−ICost (o_below)/Icost(o_mat) of tuples have been materialized.

This upper bound does not mean that the invention should always fire ECB immediately! The tradeoff is that once the ECB is fired this re-optimization opportunity is lost.

Until now, the description has only considered cardinality bounds for checkpoints that are determined statically. The SafeEagerLimit provides for a heuristics for adjusting the cardinality bounds of ECB checkpoints dynamically, while the query is executing. If ECB learns that cardinality estimates are likely to be wrong before processing SafeEagerLimit tuples, it can eagerly reoptimize. The only cost is the minimal overhead of FIG. 9 and FIG. 10. Of course, ECB can be fired after this threshold also, but due to the higher risk involved, the query run time must be pretty sure that the plan will change.

Figure 12:
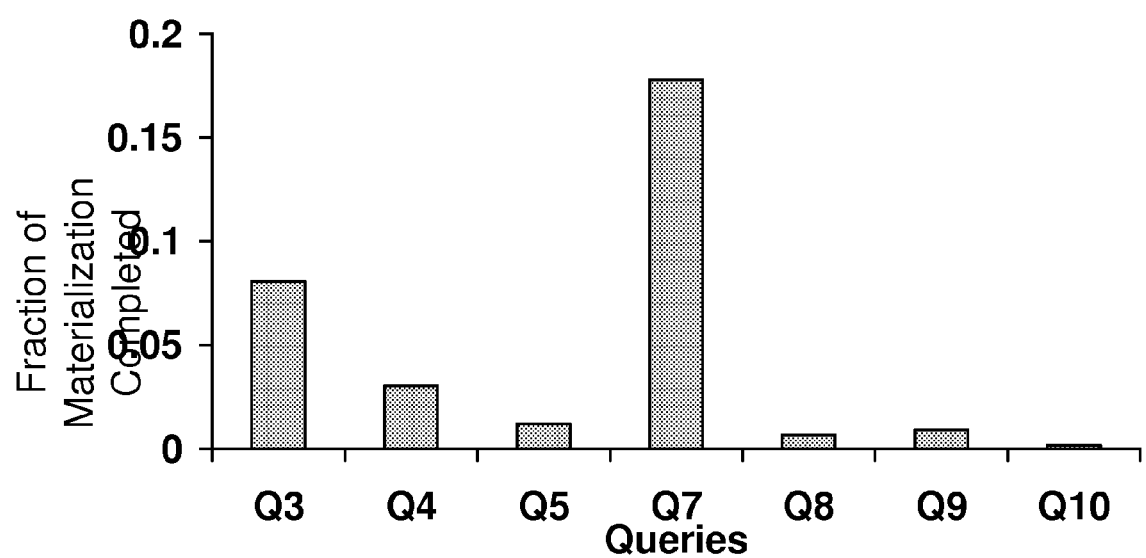
FIG. 12 is a plot of the overhead for using the SafeEagerLimit threshold for eager re-optimization below a materialization point, according to an embodiment of the invention.

FIG. 12 plots the SafeEagerLimit for various TPC-H queries. Only one ECB is chosen from the plan for each query—some queries have more than one NLJN, but we ignore that NLJNs on the small NATION and REGION tables since their materialization is virtually free. The fraction is very small for most queries—this is because the materialization cost on the NLJNs is so cheap, and the plan below the ECB invariably involves some work that will be wasted. But there are some queries like Q3 and Q7 with fairly high SafeEagerLimits, because of other materialization points in the plan under o_below. This gives the runtime the chance to calculate the probability of cardinality errors before this limit is hit. For example, assuming that tuples are scanned in an order uncorrelated with predicates, the ECB could dynamically monitor selectivities of its predicates and accordingly estimate its cardinality error.

Opportunities of Re-Optimization

Figure 13:
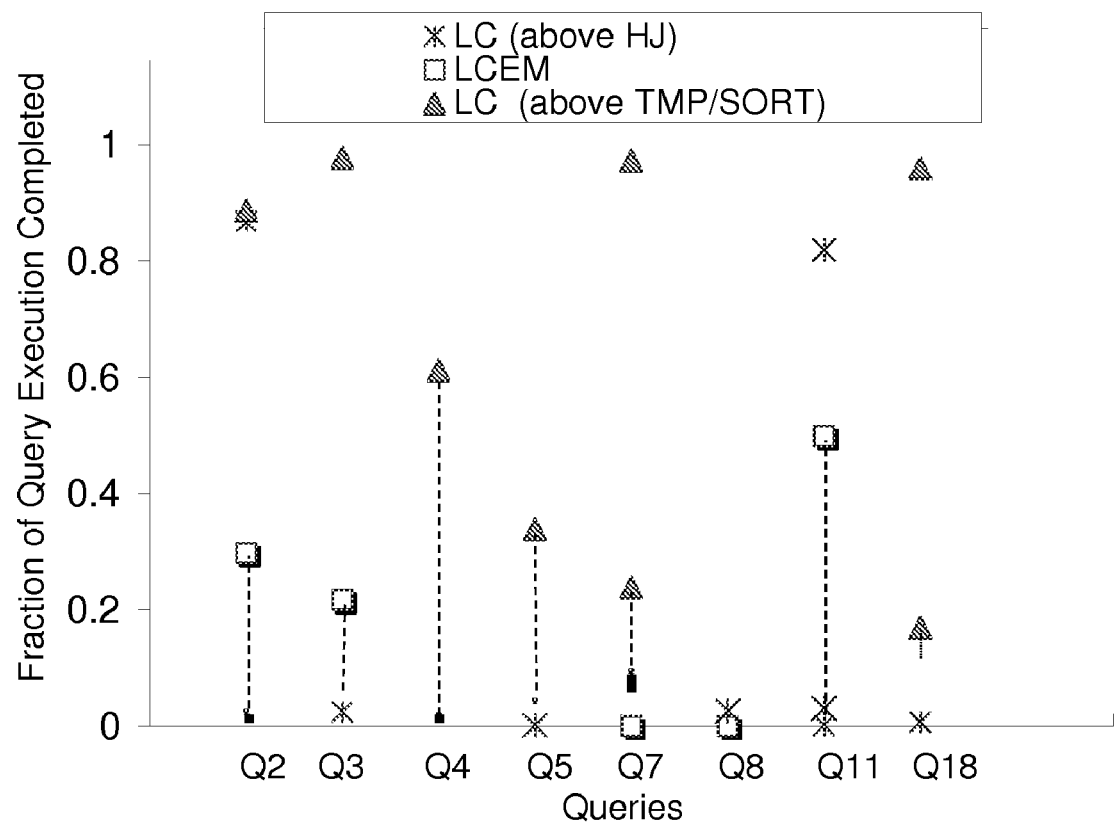
FIG. 13 is a plot of opportunities for various kinds of checkpoints, according to an embodiment of the invention.

The next experiment studies the frequency of opportunities for each flavor of re-optimization. LC, LCEM and ECB checkpoints are added to plans as in Table 1 but the actual re-optimization is disabled (so that the entire query is executed and all checkpoints are encountered). FIG. 13 is a scatter-plot of the occurrence of these opportunities during query execution. Note that the ECB checkpoint opportunities are ranges given as dashed lines; ECB can fire any time during the materialization above it, depending on how eager it is to be. The small, thick initial portion of each dashed line corresponds to the SafeEagerLimit.

FIG. 13 shows that even the low risk LC and LCEM checkpoints occur quite regularly in query execution. Even granting that the ones occurring towards the end of query execution cannot help, there are one to two checkpoints in the middle of execution and one to two at the very beginning. When ECBs are added, a sizable fraction of the query duration is available for re-optimization. Many re-optimization opportunities are closely clustered together, especially in the early stages of the query execution. This is because materialization points are separated by joins over small tables.

Examples of Re-Optimization Benefits

Having quantified the overhead of re-optimization and the availability of re-optimization opportunities, re-optimization benefits are now reviewed. The benefits of re-optimization are directly tied to the extent of optimizer errors. It is well known that a suboptimal plan can be arbitrarily slower than a better one. So the intent is to show a few illustrative examples of plan improvements, rather than focus on improvement ratios.

The TPCH benchmark that was used in testing the overhead is unfortunately a synthetic benchmark with independence assumptions built into the data generator. Hence it does not have column correlations, which are known to be the main cause of cardinality estimation errors [SLM+01]. The TPCH queries are modified (for this experiment) to use LIKE predicates, which are another SQL construct with poorly modeled cardinalities.

Join Flavor Change

Figure 14:
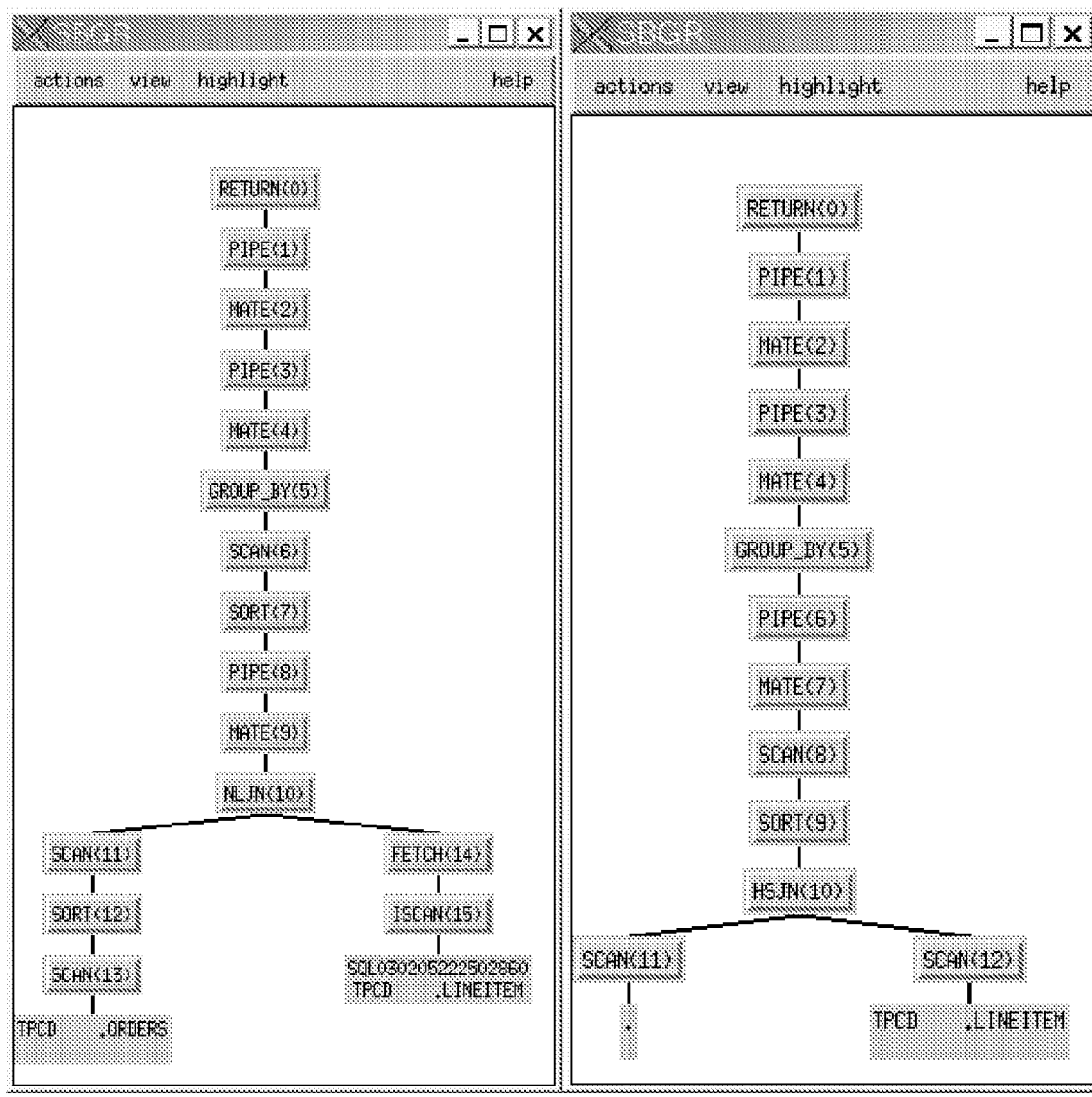
FIG. 14 is a diagram of query execution plans before and after re-optimization, according to an embodiment of the invention.

Query Q4 of TPC-H, a two-way join of ORDERS and LINEITEM, is considered and modified slightly. A LIKE predicate '%99%' is added on O_ORDERDATE to cause a cardinality estimation error of one order of magnitude on the scan of the orders table. FIG. 14 below shows the QEPs before and after re-optimization. Notice that after re-optimization the NLJN outer is reused, but as probe of the HSJN (the base table with a dot in the figure). This reduces the runtime of Q4 by a factor of 3. (The PIPE and MATE plan operators are DB2 specific and can be ignored).

Join Order Change

Figure 15:
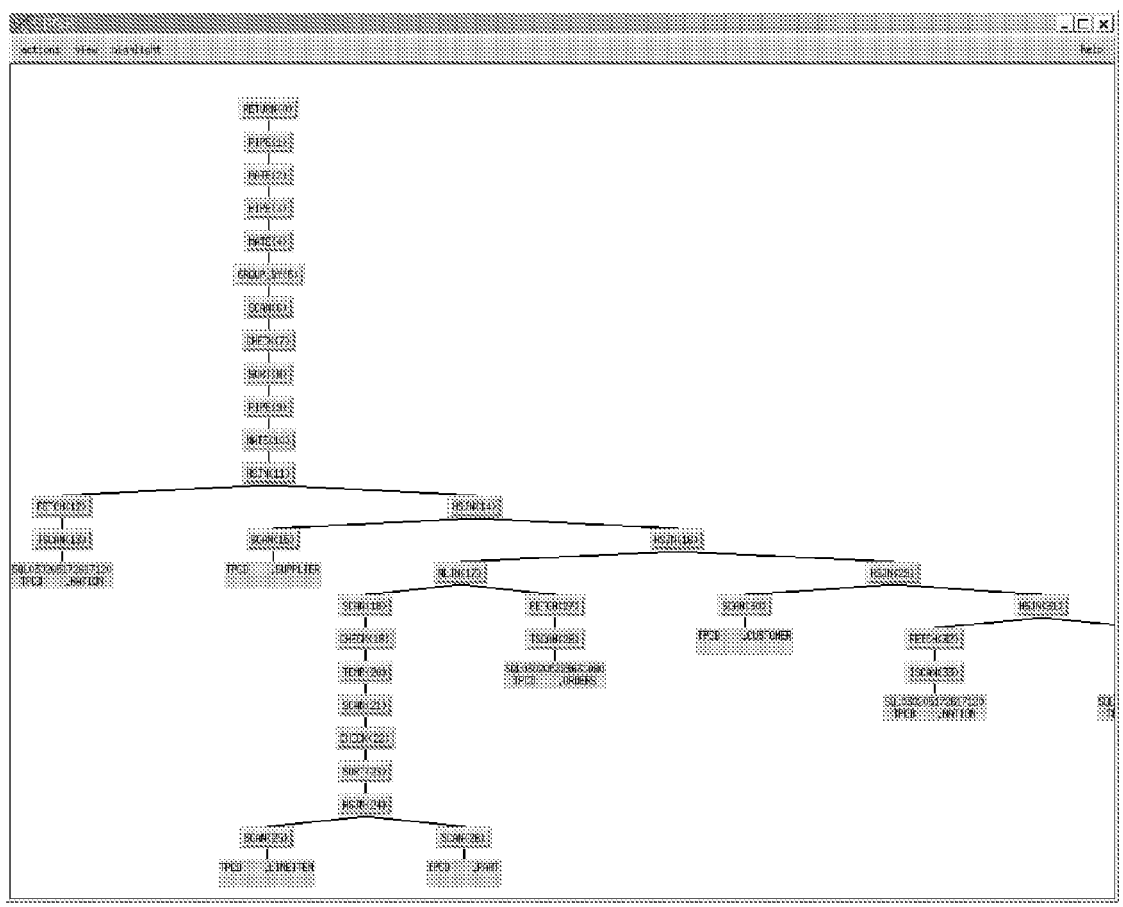
FIG. 15 is a diagram of a TPC-H query before re-optimization, according to an embodiment of the invention.
Figure 16:
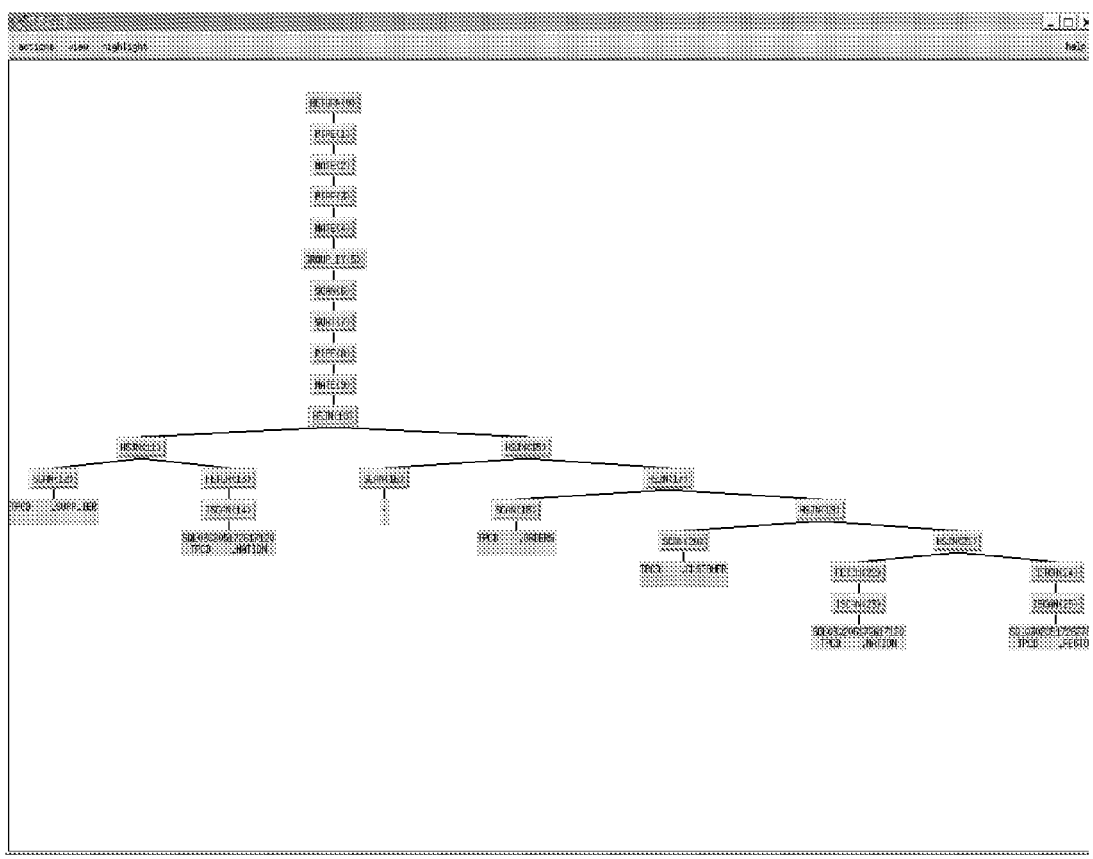
FIG. 16 is a diagram of the TPC-H query after re-optimization, according to an embodiment of the invention.

We have experimented with several other queries and found re-optimization to result in substantial plan changes when there are many operators above the cardinality error point. FIG. 15 and FIG. 16 show an example where both the join method and join order change on re-optimization, for only an error of a factor of 6 in the cardinalities.

Further Considerations

Check Condition

The reward metric is critically affected by the actual check condition, i.e., the cardinality range in which the remainder of the plan is still optimal. It is not clear how to determine this sensitivity in general, but some simple heuristics have been discovered. For the outer of a NLJN, one useful upper bound on the sensitivity is the range in which this join algorithm is optimal; i.e. range between the cross-over points of various join operators.

In general, these operator costs may vary from query to query (for example, due to applicable indexes), thus it is not possible to hard-wire constants into the system. Instead, the invention needs to derive them from the existence and cost of alternative plans that have been considered by the optimizer when compiling the original query. A detailed sensitivity analysis of the query optimizer's cost and cardinality model should be performed in order to derive a general model and heuristics for identifying when the remainder of a query plan is sub-optimal given a new cardinality for some part of the plan. This will help add more risky kinds of checkpoints in query execution plans. However from the experimental analysis it is clear that the less risky checkpoints (LC, LCEM, ECB before SafeEagerLimit) are safe to add even without detailed sensitivity analysis.

Synchronization in Parallel DBMSs

While implementing CHECK is relatively simple and straightforward for serial uni-processor environments, the cardinality counters it uses must be globally synchronized in symmetric multi-processor and shared nothing environments. Such synchronization can be a costly operation that can substantially delay query processing, and must be viewed as another risk of checkpointing in multi-processor environments. Alternatively, one can locally re-optimize a partial QEP executed on one node if the CHECK condition for this node alone is violated. Local checking in multiprocessor environments basically means that between global synchronization points (exchange operators) each node may change its plan, thus giving each node the chance to execute a different partial query plan.

Checking Opportunities

The invention can be considered to be a more conservative mode of query execution, which might be useful for complex ad-hoc queries where statistics or the optimizer's assumptions are not considered to be reliable. So in volatile environments, the optimizer could favor operators that enable further re-optimization opportunities over other operators: for example, sort-merge join over hash join, because sort-merge offers more chances for lazy re-optimization on both inputs if the CHECK condition is violated. It is possible that different embodiments of the invention described may be selected in different situations that have not yet been explored.

Ensuring Termination

The invention introduces the risk of iteratively re-optimizing a query many times. In order to ensure termination, heuristics have to be used, such as limiting the number of re-optimization attempts or by forcing the use of intermediate results after several attempts in order to ensure that progress is indeed made.

Learning for the Future

At present, the invention only helps the query that is currently under execution, but the invention is also applicable by extension to future queries, for example by combining the present invention with techniques like LEO [SLM+01].

A representative hardware environment for practicing the present invention is a typical hardware configuration of an information handling computer system in accordance with the subject invention, having at least one processor or central processing unit (CPU) 10. CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 104, and/or other user interface devices such as touch screen device (not shown) to bus 12, communication adapter 105 for connecting the information handling system to a data processing network, and display adapter 101 for connecting bus 12 to display device 102. A program storage device, readable for example by the disk or tape units, is used to load the instructions which operate the invention from a computer-readable medium onto the computer system.

The present invention and the various features and advantageous details thereof are explained with reference to the non-limiting embodiments illustrated in the accompanying drawings and detailed in the description above. Descriptions of well-known components and processing techniques are omitted so as not to unnecessarily obscure the present invention in detail. Specific embodiments of the invention have been described by non-limiting examples which serve to illustrate in some detail various features of significance. The examples are intended merely to facilitate an understanding of ways in which the invention may be practiced and to further enable those of skill in the art to practice the invention. Accordingly, the examples should not be construed as limiting the scope of the invention. While the invention has been described in terms of preferred embodiments, those skilled in the art will recognize that the invention can be practiced with modification within the spirit and scope of the appended claims.

REFERENCES

AH00=R. Avnur and J. M. Hellerstein, Eddies: Continuously Adaptive Query Optimization, SIGMOD 2000.
ARM89=R. Ahad, K. V. B. Rao, and D. McLeod, On Estimating the Cardinality of the Projection of a Database Relation, TODS 14(1), 1989.
BC02=N. Bruno and S. Chaudhuri. Exploiting Statistics on Query Expressions for Optimization, SIGMOD 2002.
CAK+81=D. D. Chamberlin, M. M. Astrahan, W. F. King, et al., Support for Repetitive Transactions and Ad-Hoc Query in System R, TODS 6(1), 1981, pp 70-94.
DR99=D. Donjerkovic and R. Ramakrishnan: Probabilistic Optimization of Top N Queries, VLDB 1999.
CG94=R. Cole and G. Graefe. Optimization of Dynamic query evaluation plans, SIGMOD 1994.
Gel93=A. Van Gelder, Multiple Join Size Estimation by Virtual Domains, PODS 1993.
HS93=P. Haas and A. Swami, Sampling-Based Selectivity Estimation for Joins—Using Augmented Frequent Value Statistics, IBM Research Report, 1993.
IC91=Y. E. Ioannidis and S. Christodoulakis. Propagation of Errors in the Size of Join Results, SIGMOD 1991.
Ives2=Z. Ives, Efficient Query Processing for Data Integration, Ph.D thesis, University of Washington, 2002.
KD98=N. Kabra and D. DeWitt, Efficient Mid-Query Re-Optimization of Sub-Optimal Query Execution Plans, SIGMOD 1998.
PIH+96=V. Poosala, Y. Ioannidis, P. Haas, and E. Shekita, Improved histograms for selectivity estimation of range predicates, SIGMOD 1996.
PI97=V. Poosala and Y. Ioannidis, Selectivity Estimation without value independence, VLDB 1997.
RAH03=V. Raman, A. Deshpande, and J. M. Hellerstein, Using State Modules for Adaptive Query Optimization. ICDE 2003.
SAC+79=P. G. Selinger et al. Access Path Selection in a Relational DBMS. SIGMOD 1979.
SS94=A. N. Swami and K. B. Schiefer, On the Estimation of Join Result Sizes, EDBT 1994.
SWK96=M. Stonebraker, E. Wong and P. Kreps. The Design and Implementation of INGRES. TODS 1(3), 1976.
UFA98=T. Urhan, M. J. Franklin, and L. Amsaleg, Cost-based Query Scrambling for Initial Delays, SIGMOD 1998.
SLM+01=M. Stillger, G. Lohman, V. Markl, and M. Kandil. LEO—DB2's Learning Optimizer, VLDB 2001.
ZCL+00=M. Zaharioudakis et. al: Answering Complex SQL Queries Using ASTs. SIGMOD 2000.

We claim:

1. A computer-implemented method for accelerating database query processing, the method comprising:
placing a number of checkpoints in a particular query execution plan generated for a database query, the particular query execution plan being based on estimated optimization parameter values derived from historic database statistics,
wherein a first subset of the number of checkpoints are placed at a first set of points in the particular query execution plan, the first set of points comprising points where an entire intermediate result is materialized before proceeding with further operators in the particular query execution plan, and wherein an explicit materialization is added to the particular query execution plan just before a second subset of the number of checkpoints to cause materialization of an intermediate result, the second subset of the number of checkpoints comprising checkpoints placed on the outer side of nested-loop joins;

executing the particular query execution plan, wherein the executing selectively retains temporarily materialized views by storing partial query results until a lazy removal condition occurs, the lazy removal conditions comprising (a) updating of at least one table contributing to a materialized view, and (b) determining that new storage space is needed for other materialized views;

computing, during the executing the particular execution plan upon encountering a given checkpoint within the number of checkpoints, a difference between the estimated optimization parameter values and actual optimization parameter values observed during the executing the particular query execution plan to determine a significance of parameter estimation errors, wherein the actual optimization parameter values comprise cardinality, memory, communication costs, and I/O operations;

determining, at the given checkpoint and based on the computing, that an amount of query execution time for the particular query execution plan is above a remaining execution time threshold and that the significance of parameter estimation errors is above an error threshold;

suspending, in response to determining that the amount of query execution time is above the remaining execution time threshold and that the significance of parameter estimation errors is above an error threshold, execution of the particular query execution plan;

re-optimizing, in response to determining that the amount of query execution time is above the remaining execution time threshold and that the significance of parameter estimation errors is above an error threshold, the particular query, wherein the re-optimizing comprises:

generating a number of alternative query execution plans, including query execution plans using the intermediate result and query execution plans that do not use the intermediate result;

assigning a respective execution cost to each alternative query execution plan, the respective execution cost being based upon database execution statistics determined during the executing; and choosing, based on the respective execution cost of each alternative query execution plan, an optimal alternative query execution plan as a re-optimized query plan;

restarting query execution with the re-optimized query plan, wherein execution of the re-optimized query plan selectively reuses the intermediate results;

buffering rows produced by the executing until the checkpoint is evaluated so as to enable pipelining with some delay, wherein exhaustion of temporary space used for the buffering triggers the re-optimization;

transferring, prior to the restarting, each result row produced by the executing the particular query execution plan to a parent operator in a pipelined manner, the transferring comprising storing respective identifiers for the each result row into a side table using an insert query execution operator just below a return query plan operator;

executing, after the restarting, an anti join between the side table and a new result stream to compensate for the rows returned, wherein executing the anti-join comprises identifying records in the side table by a respective unique derived record identifier assigned to respective records within the side table during the executing the particular query execution plan;

selectively returning records at each execution cycle when the records have not previously been returned; and outputting query results.

* * * * *